United States Patent
Takata

(10) Patent No.: US 10,661,731 B2
(45) Date of Patent: May 26, 2020

(54) WIRE ASSEMBLY AND VEHICLE INCLUDING WIRE ASSEMBLY

(71) Applicant: TOYOTA JIDOSHA KABUSHIKI KAISHA, Toyota-shi, Aichi-ken (JP)

(72) Inventor: Kazunori Takata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/257,233

(22) Filed: Jan. 25, 2019

(65) Prior Publication Data

US 2019/0241135 A1    Aug. 8, 2019

(30) Foreign Application Priority Data

Feb. 6, 2018    (JP) .................... 2018-019410

(51) Int. Cl.
| | |
|---|---|
| B60R 16/02 | (2006.01) |
| B60R 16/027 | (2006.01) |
| H02G 3/04 | (2006.01) |
| H01B 13/012 | (2006.01) |
| H01B 7/04 | (2006.01) |
| H01B 7/08 | (2006.01) |

(52) U.S. Cl.
CPC ........ B60R 16/0215 (2013.01); B60R 16/027 (2013.01); H01B 7/04 (2013.01); H01B 7/08 (2013.01); H01B 13/01254 (2013.01); H02G 3/0418 (2013.01); H02G 3/0462 (2013.01)

(58) Field of Classification Search
CPC ...... H02G 3/0437; H02G 3/0462; F16B 2/22; F16L 3/12; B60R 16/0215; B60R 16/027; H60R 16/0215; H01B 7/04; H01B 7/08; H01B 13/01254
USPC ....................................................... 174/72 A
See application file for complete search history.

(56) References Cited

U.S. PATENT DOCUMENTS

| | | | | |
|---|---|---|---|---|
| 3,757,029 | A * | 9/1973 | Marshall ................ | H01B 7/08 174/36 |
| 3,917,202 | A * | 11/1975 | Reinwall, Jr. .......... | H01R 9/26 248/68.1 |
| 3,971,105 | A * | 7/1976 | Caveney ................. | H02G 3/32 24/16 PB |
| 4,538,782 | A * | 9/1985 | Kirschenbaum ....... | H02G 3/32 174/171 |
| 2012/0103685 | A1* | 5/2012 | Blanchard .............. | B64C 3/18 174/72 A |
| 2014/0131071 | A1 | 5/2014 | Tanaka et al. | |

FOREIGN PATENT DOCUMENTS

| | | |
|---|---|---|
| JP | 2014-116286 A | 6/2014 |
| JP | 2017-185996 A | 10/2017 |

* cited by examiner

*Primary Examiner* — Steven T Sawyer
(74) *Attorney, Agent, or Firm* — Oliff PLC

(57) ABSTRACT

A wire assembly includes a flexible wire, a flat wire made of a rigid material, and a protector attached to the flat wire such that the protector and the flat wire constitute a tubular portion. The flexible wire is at least partially disposed in the tubular portion.

11 Claims, 4 Drawing Sheets

WIRE ASSEMBLY AND VEHICLE INCLUDING WIRE ASSEMBLY

INCORPORATION BY REFERENCE

The disclosure of Japanese Patent Application No. 2018-019410 filed on Feb. 6, 2018 including the specification, drawings and abstract is incorporated herein by reference in its entirety.

BACKGROUND

1. Technical Field

The present disclosure relates to a wire assembly, and relates also to a vehicle including a wire assembly.

2. Description of Related Art

Japanese Unexamined Patent Application Publication No. 2014-116286 (JP 2014-116286 A) describes a main-wire structure and a branch-wire structure for simplifying routing of a plurality of wires including an electric power line and a communication line in a vehicle.

SUMMARY

When multiple (i.e., a plurality of) wires to be routed are bundled together without using regulating devices, the cross-section of a wire bundle composed of the multiple wires takes a large circular shape. This makes it difficult to route the wire bundle in a space having a small width or a low height. In view of this, in related art, multiple wires are enclosed by two or more protectors or are bundled together by a cable band, so that the cross-sectional shape of a wire bundle composed of the multiple wires is regulated to a desired cross-sectional shape. This facilitates routing of the wire bundle in a space having a small width or a low height.

There is a vehicle including, for example, a vehicle-body side portion 100 illustrated in FIG. 5 and FIG. 6, in which the structure of a wire assembly 160 is adopted. In the wire assembly 160, a main portion of a wire bundle 160A composed of a plurality of wires including an electric power line and a communication line is enclosed by a first protector 160B and a second protector 160C. Thus, the wire assembly 160 is routed with the cross-sectional shape of the wire bundle 160A regulated to a desired cross-sectional shape.

However, in the above-described structure for routing the wire assembly 160, two securing members (the first protector 160B and the second protector 160C) are required to regulate the cross-sectional shape of the wire bundle 160A to a desired cross-sectional shape at the main portion. This leads to an increase in the number of parts. In view of this, there is still room for improvement in a structure for routing a plurality of wires in a space having a small width or a low height.

The present disclosure provides a wire assembly having a structure that allows a wire bundle composed of a plurality of wires to be routed with the cross-sectional shape of the wire bundle regulated to a desired cross-sectional shape, while restraining an increase in the number of securing members, and also provides a vehicle including the wire assembly.

A first aspect of the disclosure relates to a wire assembly disposed in, for example, a vehicle. The wire assembly includes: a flexible wire; a flat wire made of a rigid material; and a protector attached to the flat wire such that the protector and the flat wire constitute a tubular portion. The flexible wire is at least partially disposed in the tubular portion.

According to the first aspect of the disclosure, only one protector is required as a securing member for regulating the cross-sectional shape of a wire bundle composed of a plurality of wires including a flexible wire and a flat wire to a desired cross-sectional shape. This contributes to reduction in the number of parts for routing the wires, leading to cost reduction and weight reduction.

In the first aspect, a cross-section of the tubular portion may have a rectangular shape. Further, one side of the rectangular shape may be defined by the flat wire, and the remaining three sides of the rectangular shape may be defined by the protector.

With this structure, it is possible to easily regulate the cross-sectional shape of a wire bundle composed of a plurality of wires including a flexible wire and a flat wire to a rectangular cross-sectional shape. Thus, it is possible to improve the flexibility in routing the wire bundle.

In the first aspect, the protector may include a first wall having a rectangular shape, a second wall having a rectangular shape, a third wall having a rectangular shape, a first hook portion, and a second hook portion. The second wall extends from a first side of the first wall so as to be perpendicular to the first wall. The third wall extends, in the same direction as an extending direction of the second wall, from a second side of the first wall so as to be perpendicular to the first wall. The second side is on the opposite side of the first wall from the first side. The first hook portion protrudes from a distal end side of the second wall toward the third wall. The distal end side of the second wall is on the opposite side of the second wall from a connection side at which the second wall is connected to the first wall. The second hook portion protrudes from a distal end side of the third wall toward the second wall. The distal end side of the third wall is on the opposite side of the third wall from a connection side at which the third wall is connected to the first wall.

In the first aspect, the cross section of the tubular portion may have an oblong shape. Further, the flat wire and the protector may be disposed such that a longitudinal direction of the oblong shape extends in an up-down direction of the vehicle.

In the first aspect, the flexible wire may be composed of a plurality of wires. In the first aspect, the flexible wire may be disposed in the tubular portion, as viewed in a cross-section of the tubular portion. In the first aspect, the flexible wire may extend through the tubular portion.

A second aspect of the disclosure relates to a vehicle including the wire assembly according to the first aspect. The wire assembly is disposed so as to extend in a front-rear direction of the vehicle. The vehicle according to the second aspect may further include: a center pillar including a pillar inner panel; and an interior trim disposed inward of the pillar inner panel in a vehicle-width direction. The protector may be disposed at a position that is at a lower end portion of the center pillar and that is between the pillar inner panel and the interior trim.

According to the second aspect, the protector is disposed in, for example, a space between the pillar inner panel and the interior trim, whereby the wire bundle is efficiently routed.

According to the foregoing aspects of the disclosure, it is possible to route a wire bundle composed of a plurality of wires with the cross-sectional shape of the wire bundle regulated to a desired cross-sectional shape, while restraining an increase in the number of securing members.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Outline

Figure 1:
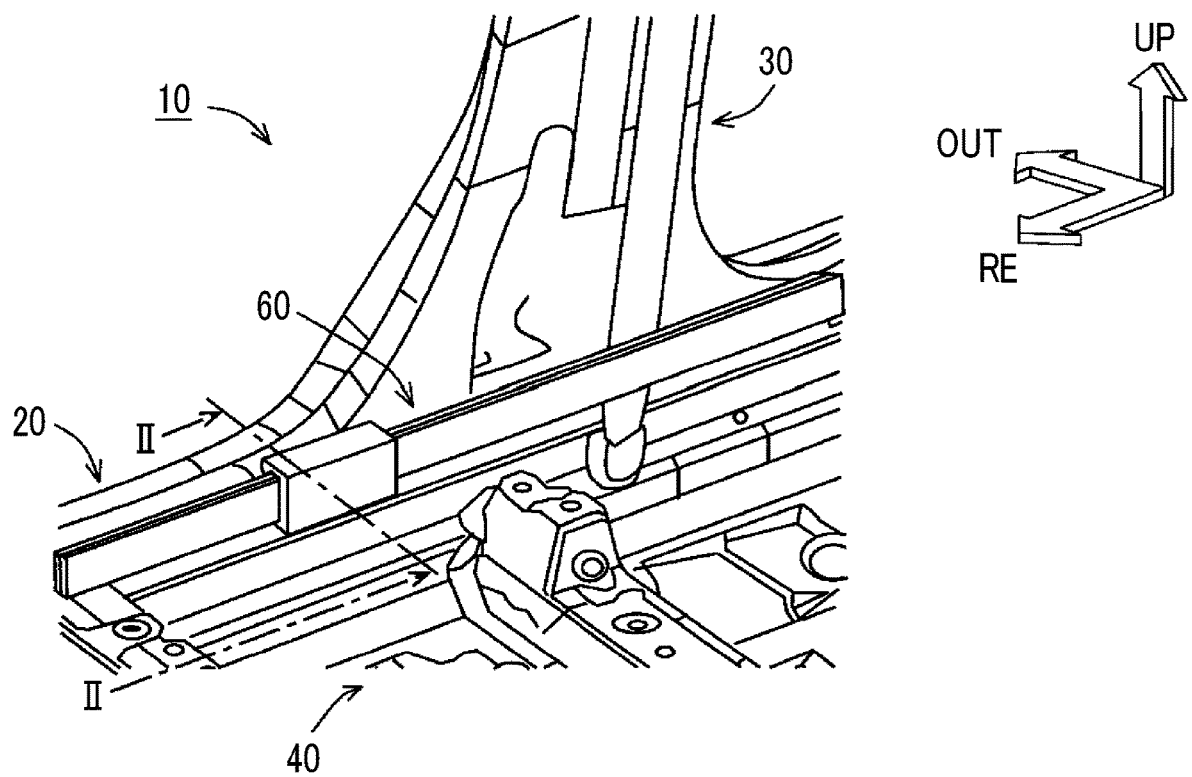
FIG. 1 is a perspective view of a vehicle-body side portion of a vehicle including a wire assembly according to an embodiment.

In a wire assembly according to an embodiment, a flat wire and a protector constitute a tubular portion that defines a space having a rectangular cross-section, and a flexible wire is disposed so as to extend through the tubular portion composed of the flat wire and the protector. With this structure, only one protector is required as a securing member for regulating the cross-sectional shape of a wire bundle composed of a plurality of wires including the flexible wire and the flat wire to a desired cross-sectional shape. This contributes to reduction in the number of parts for routing the wires.

Hereinafter, a vehicle including a structure for routing a plurality of wires according to an embodiment will be described in detail with reference to the accompanying drawings. In the drawings, an arrow UP indicates the upper side in a vehicle up-down direction, an arrow RE indicates the rear side in a vehicle front-rear direction, and an arrow OUT indicates the outside in a vehicle-width direction.

Structure of Vehicle

Figure 2:
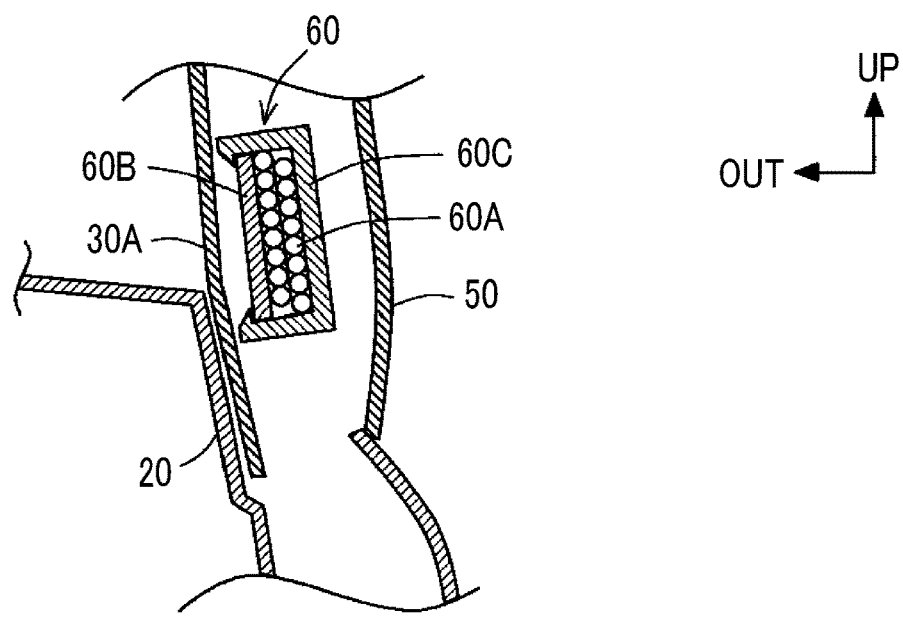
FIG. 2 is a sectional view of the vehicle-body side portion taken along line II-II illustrated in FIG. 1.

FIG. 1 is a perspective view illustrating a structure of a main part of a vehicle-body side portion 10 of a vehicle including a wire assembly according to an embodiment, as viewed obliquely from a rear right side of the vehicle. FIG. 2 is a sectional view of the vehicle-body side portion 10 taken along line II-II illustrated in FIG. 1. The sectional view in FIG. 2 indicates a structure that is not illustrated in FIG. 1. While the structure of the vehicle-body side portion 10 on the left side will be described, the same structure may be applied to a vehicle-body side portion 10 on the right side.

As illustrated in FIG. 1 and FIG. 2, in a lower portion of the vehicle-body side portion 10, a rocker 20 that constitutes a part of a framework of a vehicle body extends in the front-rear direction of the vehicle. The rockers 20 are substantially symmetrically disposed on the right and left sides of the vehicle in the vehicle-width direction. A lower end portion of the center pillar 30 and an end portion of a floor panel 40 in the vehicle-width direction are connected to a predetermined portion of the rocker 20.

The rocker 20 includes a rocker outer panel and a rocker inner panel that is disposed inward of the rocker outer panel in the vehicle-width direction. The rocker outer panel and the rocker inner panel are bonded together to provide a generally rectangular hollow structure having a closed section (not illustrated). Note that the rocker 20 in the following description of the present embodiment indicates the rocker inner panel.

A pillar inner panel 30A included in the center pillar 30 is bonded to the rocker 20 by spot welding or the like such that the pillar inner panel 30A is disposed inward of the rocker 20 in the vehicle-width direction. A wire assembly 60 described below is disposed inward of the pillar inner panel 30A in the vehicle-width direction such that the pillar inner panel 30A extends in the vehicle front-rear direction. The wire assembly 60 is covered with an interior trim 50.

Figure 3:
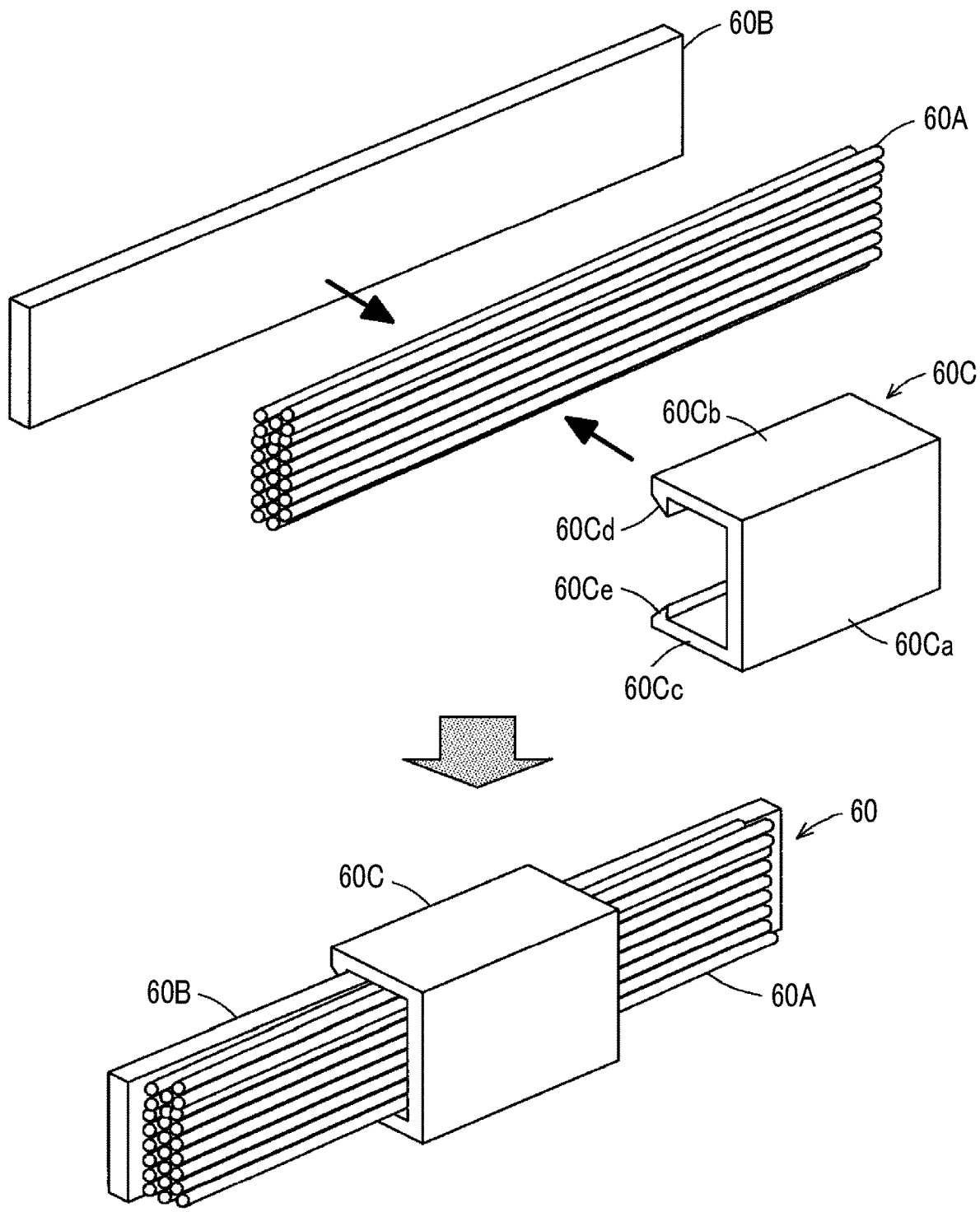
FIG. 3 is a view illustrating the structure of the wire assembly according to the embodiment.

The wire assembly 60 will be described with reference also to FIG. 3. FIG. 3 is a view illustrating the structure of the wire assembly 60 according to the present embodiment. The wire assembly 60 includes a flexible wire 60A, a flat wire 60B, and a protector 60C.

The flexible wire 60A is, for example, a communication line, and is composed of a single wire or a plurality of wires. In the flexible wire 60A, a portion where electrical connection is not required, that is, a portion other than a connection terminal, is coated with, for example, an insulating film, and is thus electrically insulated.

The flat wire 60B is, for example, a substantially flat plate strip-shaped member made of a conductive rigid material, such as iron, copper, or aluminum. The flat wire 60B is an electric power line for supplying electric power to a load, such as an electronic control unit (ECU) (not illustrated) mounted in the vehicle. In the flat wire 60B, a portion where electrical connection is not required, that is, a portion other than a connection terminal, is coated with, for example, an insulating film, and is thus electrically insulated.

The protector 60C is a securing member made of a material, such as insulating resin. The protector 60C includes a first wall 60Ca having a rectangular shape, a second wall 60Cb having a rectangular shape, a third wall 60Cc having a rectangular shape, a first hook portion 60Cd, and a second hook portion 60Ce. The second wall 60Cb extends from a first side of the first wall 60Ca so as to be perpendicular to the first wall 60Ca. The third wall 60Cc extends, in the same direction as an extending direction of the second wall 60Cb, from a second side of the first wall 60Ca so as to be perpendicular to the first wall 60Ca. The second side is on the opposite side of the first wall 60Ca from the first side. The first hook portion 60Cd protrudes from a distal end side of the second wall 60Cb toward the third wall 60Cc. The distal end side of the second wall 60Cb is on the opposite side of the second wall 60Cb from a connection side at which the second wall 60Cb is connected to the first wall 60Ca. The second hook portion 60Ce protrudes from a distal end side of the third wall 60Cc toward the second wall 60Cb. The distal end side of the third wall 60Cc is on the opposite side of the third wall 60Cc from a connection side at which the third wall 60Cc is connected to the first wall 60Ca.

The protector 60C is attached to a predetermined part of the flat wire 60B in a direction of the distal end sides provided with the first hook portion 60Cd and the second hook portion 60Ce, thereby constituting a tubular portion that defines a space having a predetermined cross-section. The space is surrounded by the flat wire 60B and the protector 60C. The flexible wire 60A is at least partially disposed in the tubular portion, whereby the cross-sectional shape of the wire assembly 60 is regulated to a desired cross-sectional shape. In the example illustrated in FIG. 2 and FIG. 3, one side of the tubular portion having a rectangular cross-section is defined by the flat wire 60B and the remaining three sides thereof are defined by the protector 60C, and the tubular portion regulates the cross-sectional shape of the wire assembly 60 to a rectangular shape. The predetermined part of the flat wire 60B is a part where the cross-sectional shape of the wire assembly 60 needs to be regulated on a path along which the flat wire 60B is routed, and is, for example, a part that is at the lower end portion of the center pillar 30 and that is between the pillar inner panel 30A and the interior trim 50. The protector 60C is attached to such a part, whereby it is possible to efficiently route the wire assembly 60.

The shape of each of the first wall 60Ca, the second wall 60Cb, and the third wall 60Cc of the protector 60C may be changed as needed depending on, for example, a cross-sectional shape to which the cross-sectional shape of the wire assembly 60 is to be regulated, or a routing space in the vehicle. The shapes and positions of the first hook portion 60Cd and the second hook portion 60Ce provided respectively on the second wall 60Cb and the third wall 60Cc of the protector 60C are not limited to those illustrated in the drawing as long as a state where the protector 60C is attached to the flat wire 60B can be maintained.

When the protector 60C is provided with a securing function (clamp mechanism or the like) for securing the protector 60C to the vehicle, it is possible to easily secure the wire assembly 60 to the vehicle.

Operations and Advantageous Effects of Present Embodiment

As described above, with the structure of the wire assembly 60 according to the present embodiment, the tubular portion defining a space having a rectangular cross-section is composed of the flat wire 60B made of a rigid material and the protector 60C, and the flexible wire 60A is disposed in the tubular portion so as to extend through the tubular portion composed of the flat wire 60B and the protector 60C.

With this structure, only one protector 60C is required as a securing member for regulating the cross-sectional shape of the wire assembly 60 that includes a plurality of wires including the flexible wire 60A and the flat wire 60B to a desired cross-sectional shape. This contributes to reduction in the number of parts for routing the wire assembly 60, leading to cost reduction and weight reduction. Furthermore, the cross-sectional shape of the wire assembly 60 is easily regulated to a desired cross-sectional shape by the flat wire 60B and the protector 60C. Thus, it is possible to improve the flexibility in routing the wire assembly 60.

Figure 4:
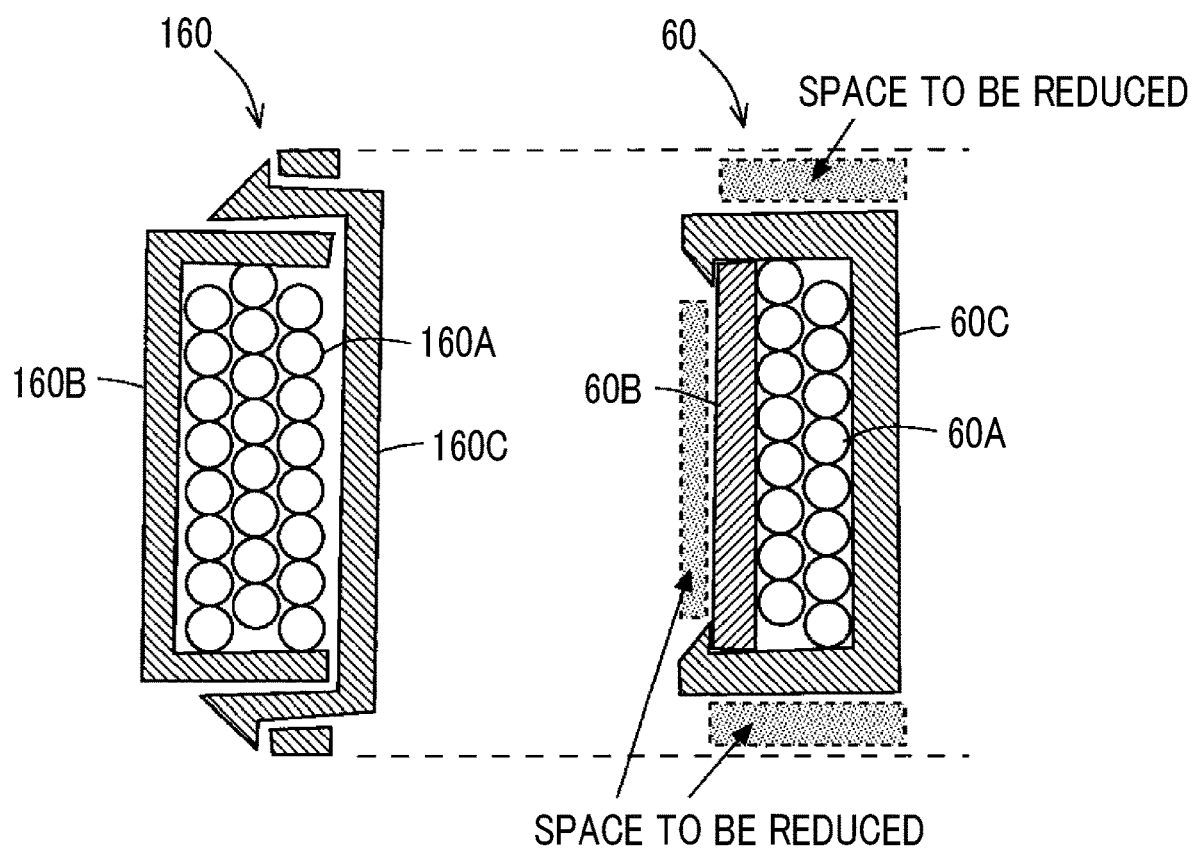
FIG. 4 is a view illustrating a space that can be saved through adoption of the wire assembly according to the embodiment.
Figure 5:
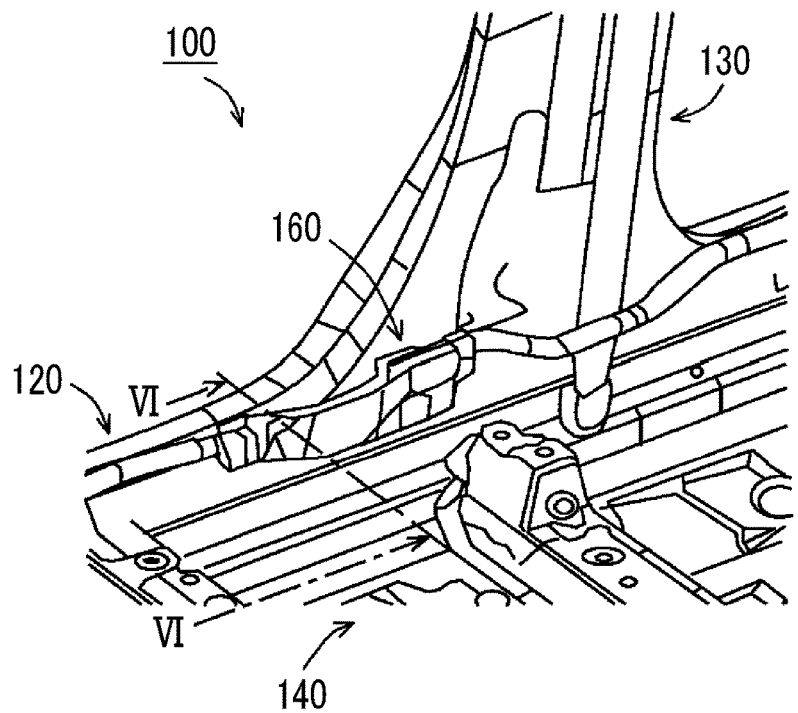
FIG. 5 a perspective view of a vehicle-body side portion of a vehicle including a wire assembly according to related art.
Figure 5:
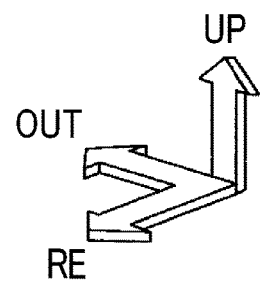
Figure 6:
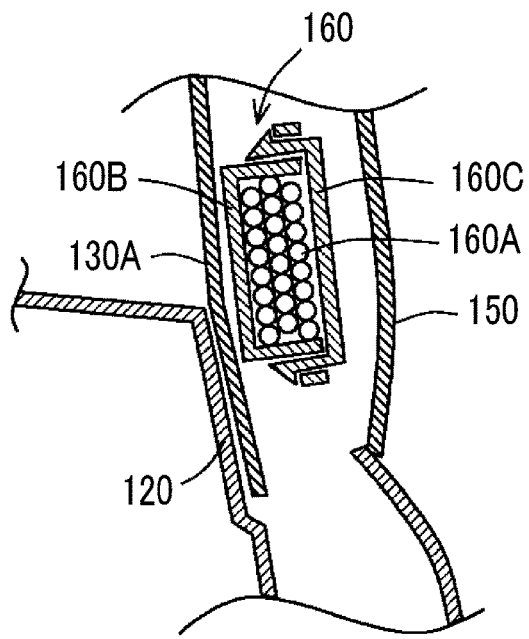
FIG. 6 is a sectional view of the vehicle-body side portion taken along line VI-VI illustrated in FIG. 5.
Figure 6:
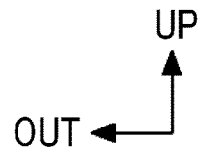

As illustrated in FIG. 4, with the structure (on the right side in FIG. 4) of the wire assembly 60 according to the present embodiment, it is possible to save space (indicated by dotted lines in FIG. 4) required to route wires as compared with the structure (on the left side in FIG. 4) of the wire assembly 160 in the related art.

The wire assembly according to the foregoing embodiment is applicable to a vehicle, such as an automobile, and is useful in routing a plurality of wires with a cross sectional shape of a bundle of the wires regulated to a desired shape while restraining an increase in the number of securing members.

What is claimed is:

1. A wire assembly mounted in a vehicle comprising:
a flexible wire for transmitting a signal;
a flat wire made of a conductive, rigid material for supplying electronic power to a load mounted in the vehicle; and
a protector attached to the flat wire such that the protector and the flat wire constitute a tubular portion,
wherein:
the flexible wire is at least partially disposed in the tubular portion;
a cross-section of the tubular portion has a rectangular shape;
one side of the rectangular shape is defined by the flat wire, and the remaining three sides of the rectangular shape are defined by the protector; and
the protector includes:
a first wall having a rectangular shape;
a second wall having a rectangular shape, the second wall extending from a first side of the first wall so as to be perpendicular to the first wall;
a third wall having a rectangular shape, the third wall extending, in the same direction as an extending direction of the second wall, from a second side of the first wall so as to be perpendicular to the first wall, the second side being on an opposite side of the first wall from the first side;
a first hook portion protruding from a distal end side of the second wall toward the third wall, the distal end side being on an opposite side of the second wall from a connection side at which the second wall is connected to the first wall; and
a second hook portion protruding from a distal end side of the third wall toward the second wall, the distal end side being on an opposite side of the third wall from a connection side at which the third wall is connected to the first wall.

2. The wire assembly according to claim 1, wherein:
the cross section of the tubular portion has an oblong shape; and
the flat wire and the protector are disposed such that a longitudinal direction of the oblong shape extends in an up-down direction of a vehicle.

3. The wire assembly according to claim 1, wherein the flexible wire is composed of a plurality of wires.

4. The wire assembly according to claim 1, wherein the flexible wire is disposed in the tubular portion, as viewed in a cross-section of the tubular portion.

5. The wire assembly according to claim 1, wherein the flexible wire extends through the tubular portion.

6. A vehicle comprising the wire assembly according to claim 1, wherein the wire assembly is disposed so as to extend in a front-rear direction of the vehicle.

7. The vehicle according to claim 6, further comprising:
a center pillar including a pillar inner panel; and
an interior trim disposed inward of the pillar inner panel in a vehicle-width direction,
wherein the protector is disposed at a position that is at a lower end portion of the center pillar and that is between the pillar inner panel and the interior trim.

8. The wire assembly according to claim 1, wherein the flat wire is support by:
the first hook portion and the second hook portion in a first direction that: (i) is perpendicular to a first surface of the flat wire in contact with the first hook portion and the second hook portion and (ii) extends away from the first wall of the protector;
the second wall of the protector in a second direction that: (i) is perpendicular to a second surface of the flat wire in contact with the second wall of the protector and (ii) extends away from the second wall of the protector;

the third wall of the protector in a third direction opposite to the second direction; and the flexible wire in a fourth direction opposite to the first direction.

9. The wire assembly according to claim 1, wherein the flat wire is supported by:

the first hook portion the second hook portion of the protector on one side of the flat wire, and the flexible wire on an opposite side of the flat wire.

10. The wire assembly according to claim 1, wherein the flat wire is sandwiched directly between: (i) the first hook portion and the second hook portion, and (ii) the flexible wire in a direction parallel to the extending direction of the second wall and the third wall of the protector.

11. The wire assembly according to claim 1, wherein the protector is made of an insulating resin.

\* \* \* \* \*